United States Patent
Taaghol (10) Patent No.: US 8,547,932 B2
(45) Date of Patent: Oct. 1, 2013

(54) HANDOVER ARCHITECTURE FOR NON-INTEGRATED RADIO ACCESS TECHNOLOGIES

(75) Inventor: Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 12/917,296

(22) Filed: Nov. 1, 2010

(65) Prior Publication Data

US 2012/0106506 A1 May 3, 2012

(51) Int. Cl.
*H04W 4/00* (2009.01)

(52) U.S. Cl.
USPC .......................................................... 370/331

(58) Field of Classification Search
USPC .......................................................... 370/331
See application file for complete search history.

(56) References Cited

U.S. PATENT DOCUMENTS

| | | | |
|---|---|---|---|
| 2002/0160785 A1* | 10/2002 | Ovesjo et al. ................. | 455/453 |
| 2004/0162086 A1* | 8/2004 | Han ........................... | 455/456.1 |
| 2007/0213055 A1* | 9/2007 | Sundberg et al. ............ | 455/436 |
| 2008/0188223 A1* | 8/2008 | Vesterinen et al. .......... | 455/436 |
| 2008/0194262 A1* | 8/2008 | Choi et al. .................... | 455/437 |
| 2008/0305799 A1 | 12/2008 | Zuniga et al. | |
| 2009/0005029 A1* | 1/2009 | Wang et al. ................... | 455/423 |
| 2009/0093251 A1* | 4/2009 | Cai et al. ....................... | 455/436 |
| 2009/0111468 A1* | 4/2009 | Burgess et al. ............... | 455/436 |
| 2009/0149189 A1* | 6/2009 | Sammour et al. ............. | 455/450 |
| 2010/0113024 A1 | 5/2010 | Wu | |
| 2010/0167719 A1 | 7/2010 | Sun et al. | |
| 2010/0317375 A1* | 12/2010 | Burbidge et al. ............. | 455/458 |
| 2011/0103277 A1* | 5/2011 | Watfa et al. .................. | 370/310 |
| 2011/0165875 A1* | 7/2011 | Wu .............................. | 455/436 |
| 2011/0261796 A1* | 10/2011 | Moeller et al. ............... | 370/338 |
| 2011/0286465 A1* | 11/2011 | Koodli et al. ................. | 370/401 |

FOREIGN PATENT DOCUMENTS

| | | |
|---|---|---|
| WO | 2010/034009 A1 | 3/2010 |
| WO | 2012/061051 A2 | 5/2012 |
| WO | 2012/061051 A3 | 6/2012 |

OTHER PUBLICATIONS

International Search report and Written Opinion Received for PCT Patent Application No. PCT/US2011/057430, Mailed on May 9, 2012, 9 pages.
International Preliminary Report on Patentability and Written Opinion received for PCT Patent Application No. PCT/US2011/057430, mailed on May 7, 2013, 5 pages.

* cited by examiner

*Primary Examiner* — Steven H Nguyen
*Assistant Examiner* — Saad A Waqas
(74) *Attorney, Agent, or Firm* — Cool Patent, P.C.

(57) ABSTRACT

An apparatus to support handover for non-integrated radio devices is presented. In one embodiment, the apparatus includes a peer interface and radio resource control logic. The radio resource control logic includes a proxy commutatively coupled to a second proxy via the peer interface. The second proxy is a part of other radio resource control logic. The proxies are operable to support handover between different radio access technologies.

18 Claims, 5 Drawing Sheets

HANDOVER ARCHITECTURE FOR NON-INTEGRATED RADIO ACCESS TECHNOLOGIES

FIELD OF THE INVENTION

Embodiments of the invention are related to wireless communication systems, more particularly, for implementing a handover between different radio access technologies (RATs).

BACKGROUND OF THE INVENTION

Wireless access systems and radio access technologies (RATs) have been developed to provide different types of services. Some examples of the wireless access systems include wireless local area networks (WLANs), (such as IEEE 802-based networks), and cellular networks, (such as universal mobile telecommunication systems (UMTS) terrestrial radio access network (UTRAN), an evolved UTRAN (E-UTRAN), a GPRS/EDGE radio access network (GE-RAN), or the like).

With the pervasive adoption of wireless communication networks in enterprise, residential and public domains, users of such networks may move from one network to another while enjoying continuous connectivity. Wireless transmit/receive units (WTRUs) (e.g., mobile stations, user equipments, etc.) are required to support multiple heterogeneous networks to support an "always-on" scenario. Thus, a seamless handover between these networks is therefore important.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

An apparatus to support handover for non-integrated radio devices is presented. In one embodiment, the apparatus includes a bridging interface and radio resource control logic. The radio resource control logic includes a proxy commutatively coupled to a second proxy via the bridging interface. The second proxy is a part of other radio resource control logic. The proxies are operable to support handover between different radio access technologies.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The methods and apparatuses described herein are for performing handover between different radio access technologies (RAT). Specifically, the methods and apparatuses are primarily discussed in reference to common computer systems. However, the methods and apparatuses are not so limited, as they may be implemented on or in association with any integrated circuit device or system, such as cell phones, personal digital assistants, embedded controllers, mobile platforms, desktop platforms, and server platforms, as well as in conjunction with other resources.

Overview

An apparatus to support handover for non-integrated radio devices is presented. In one embodiment, the apparatus includes a bridging interface and radio resource control logic. The radio resource control logic includes a proxy commutatively coupled to a second proxy via the bridging interface. The second proxy is a part of other radio resource control logic. The proxies are operable to support handover between different radio access technologies.

Figure 1:
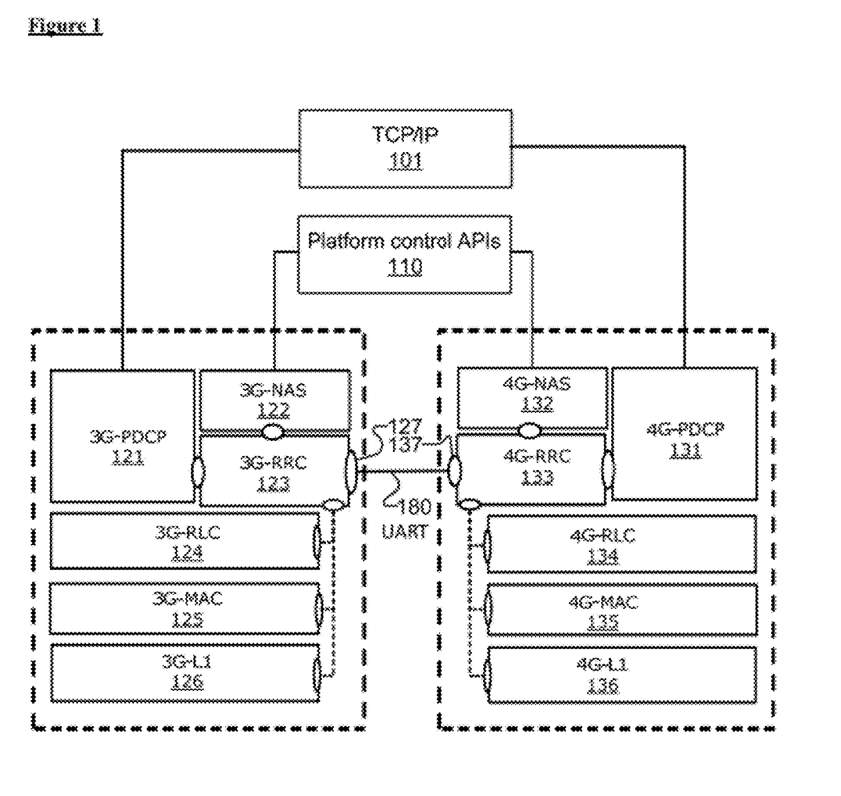
FIG. 1 is a block diagram of an embodiment of the architecture for inter-RAT (radio access technology) handover.

FIG. 1 is a block diagram of an embodiment of the architecture for inter-RAT (radio access technology) handover. Many related components have not been shown to avoid obscuring the invention. Referring to FIG. 1, in one embodiment, the architecture comprises TCP/IP 101, platform control APIs 110, a 3G RAT system, and a 4G RAT system. In one embodiment, the 3G RAT system includes 3G-PDCP (packet data convergence protocol) 121, 3G-NAS (non-access stratum) 122, 3G-RRC (radio resource control) 123, 3G-RLC (radio link control) 124, 3G-MAC (medium access control) 125, and 3G-L1 (layer 1) 126, proxy agent 127. In one embodiment, the 4G RAT system includes 4G-PDCP 131, 4G-NAS 132, 4G-RRC 133, 4G-RLC 134, 4G-MAC 135, and 4G-L1 136, and proxy agent 137.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof. It will be appreciated by those skilled in the art that other RAT systems may be used while maintaining approximately the same characteristic.

In one embodiment, inter-RAT interworking and handover is performed in conjunction with close collaboration between RAT systems. RAT systems (or subsystems, modules, etc.) are logically or physically separated, for example, each RAT system operates on its own separate protocol stack. In one embodiment, the RAT systems do not share underlying radio hardware resources, such as, for example, RF (radio frequency) subsystem. In one embodiment, RAT systems share radio hardware resources, however, RAT systems logically operate on two different protocol stacks. Each RAT subsystem is self-containing and is capable of performing radio measurements and resource control independently.

In one embodiment, if two RAT systems are physically separate, a low bandwidth interface, such as, for example universal asynchronous receiver/transmitter (UART) 180, is used to bridge the RAT systems. Although, the interface is discussed herein primarily with reference to UART 180, other interconnects including a serial interface, a parallel interface, or a combination of both may be used to bridge the two RAT systems.

In one embodiment, the logical peering for interworking is performed by radio resource control (RRC) layer (e.g., 3G-RRC 123 and 4G-RRC 133) of the RAT systems. In one embodiment, 3G-RRC 123 includes proxy agent 127, whereas, 4G-RRC 133 includes proxy agent 137. The proxy agents support inter-RAT operations by identifying messages, transferring messages, transferring context (such as security), and triggering inter-RAT procedures.

In one embodiment, RRC is a sub-layer of Layer 3 on UMTS (and subsequent generations thereof) radio interface. RRC layer exists in the control plane only and provides information transfer service to the NAS (Non Access Stratum). RRC is responsible for controlling the configuration of UMTS radio interface Layers 1 and 2. In one embodiment, Layer 3 is also referred to as the OSI (Open Systems Interconnection) Network Layer. Layer 3 provides the paths for the transfer of data between systems and across networks.

In one embodiment, for example, in a cellular system (e.g., 3GPP), handover (inter-technology or intra-technology) is managed and controlled by the core network. Handover steps are performed in conjunction with the RRC CONNECTED mode using dedicated signaling channels. In one embodiment, the idle mobility uses a similar process as explained below, without reporting measurements to the network and the handover decision is made by a UE (user equipment).

In one embodiment, UTRAN (UMTS Terrestrial Radio Access Network) is a collective term for the Node B's and Radio Network Controllers which make up the UMTS radio access network. This communications network, commonly referred to as 3G (for 3rd Generation Wireless Mobile Communication Technology). The UTRAN allows connectivity between the UE (user equipment) and the core network. The UTRAN includes base stations, which are called Node Bs (NB), and Radio Network Controllers (RNC). In one embodiment, eUTRAN (evolved UMTS Terrestrial Radio Access Network) is the air interface of 3GPP's Long Term Evolution (LTE) upgrade path for mobile networks.

Measurement and Handover

In one embodiment, steps for preparation and execution of a handover procedure include measurement, handover preparation, and handover execution. In one embodiment, measurement further includes measurement control, performing measurement, and measurement reporting.

In one embodiment, measurement control is a process to establish, modify, and release measurements. The measurements in 3GPP systems are controlled by the network using a measurement configuration (measConfig) which is sent by a serving RAT to the one or more target RAT(s). A measurement configuration is sent in conjunction with a RRC connection reconfiguration message (e.g., RRCConnectionReconfiguration) if the UE is served by LTE. A measurement configuration is sent in conjunction with a RRC measurement control message (e.g., RRCMeasurementControl) if the UE is served by UTRAN (3G). In one embodiment, a measurement configuration includes the following parameters: measurement object (measObject), reporting configuration, measurement identities, quantity configuration, and measurement gaps.

In one embodiment, performing measurement is a process in which a UE measures, filters, and consolidates the observed/received signals of neighboring cells or technologies. In one embodiment, measurement reporting is generated based on the measurement configuration. In one embodiment, measurement reporting is a process to report measurements performed by a UE to the network. The reporting criterion (periodic or single event) and reporting format (quantities and associated information) are defined by the measurement configuration.

In one embodiment, during handover preparation, the network determines that an inter-RAT handover is required based on measurement reports received from a UE. During the handover preparation, the target RAT is also prepared for an incoming handover. In one embodiment, handover preparation does not involve a UE, because handover preparation is completely performed within the core network.

In one embodiment, handover execution is an actual mechanics for the handover to occur end-to-end. Handover execution includes many phases in a network. With respect to a UE, the UE receives an embedded handover message. The message is from a serving RAT instructing the UE to perform handover to a target RAT. The radio configuration details of the target RAT are embedded in the handover command message. In one embodiment, a handover command contains a target RAT handover message in an embedded format. Examples of the embedded inter-RAT message are shown in Table 1.

TABLE 1

Examples of a handover command

| RAT | Embedded message |
|---|---|
| GSM | Handover Command |
| | PS Handover Command |
| | DTM Handover Command |
| GERAN Iu | Radio Bearer Reconfiguration |
| EUTRAN | RRC Connection Reconfiguration |
| UTRAN | Handover To UTRAN |

In one embodiment, an example of a handover process from a EUTRAN (LTE) to UTRAN (3G) includes: EUTRAN sends a "mobility from EUTRAN" command to a UE. The command includes an embedded message (e.g., Handover to UTRAN command). The UE, in response to the handover command, performs and completes the handover execution with UTRAN.

In one embodiment, an example of a handover process from a UTRAN (3G) to EUTRAN (LTE) includes: UTRAN sends a "handover from UTRAN" command to a UE. The command includes an embedded message (e.g., EUTRAN RRC connection reconfiguration). The UE, in response to the handover command, performs and completes the handover execution with EUTRAN.

In one embodiment, tight interworking with legacy wireless technologies that are built into separate modules or discrete IP are supported by using proxy agent 127, proxy agent 137, and UART 180. In one embodiment, architecture with respect to FIG. 1 enables tight interworking and inter-technology handover between discrete or separate modules. Detailed operations will be described in further detail below with additional references to the remaining figures.

In one embodiment, the handover process is performed in conjunction with a base station, a mobile station, or both depending on the RAT. In one embodiment, a base station is a transmitter in a downstream or downlink case. A transmitter may be interchangeably referred to as an advance base station, a base station (BS), an enhanced Node B (eNB), or an access point (AP) at the system level herein. In this downlink case, a mobile station is a receiver. A receiver may be interchangeably referred to as an advanced mobile station (AMS), a mobile station (MS), a subscriber station (SS), a user equipment (UE), or a station (STA) at the system level herein. Further, the terms ABS, BS, eNB, and AP may be conceptually interchanged, depending on which wireless protocol is being used, so a reference to BS herein may also be seen as a reference to either of ABS, eNB, or AP. Similarly, a reference to MS herein may also be seen as a reference to either of AMS, SS, UE, or STA.

Figure 2:
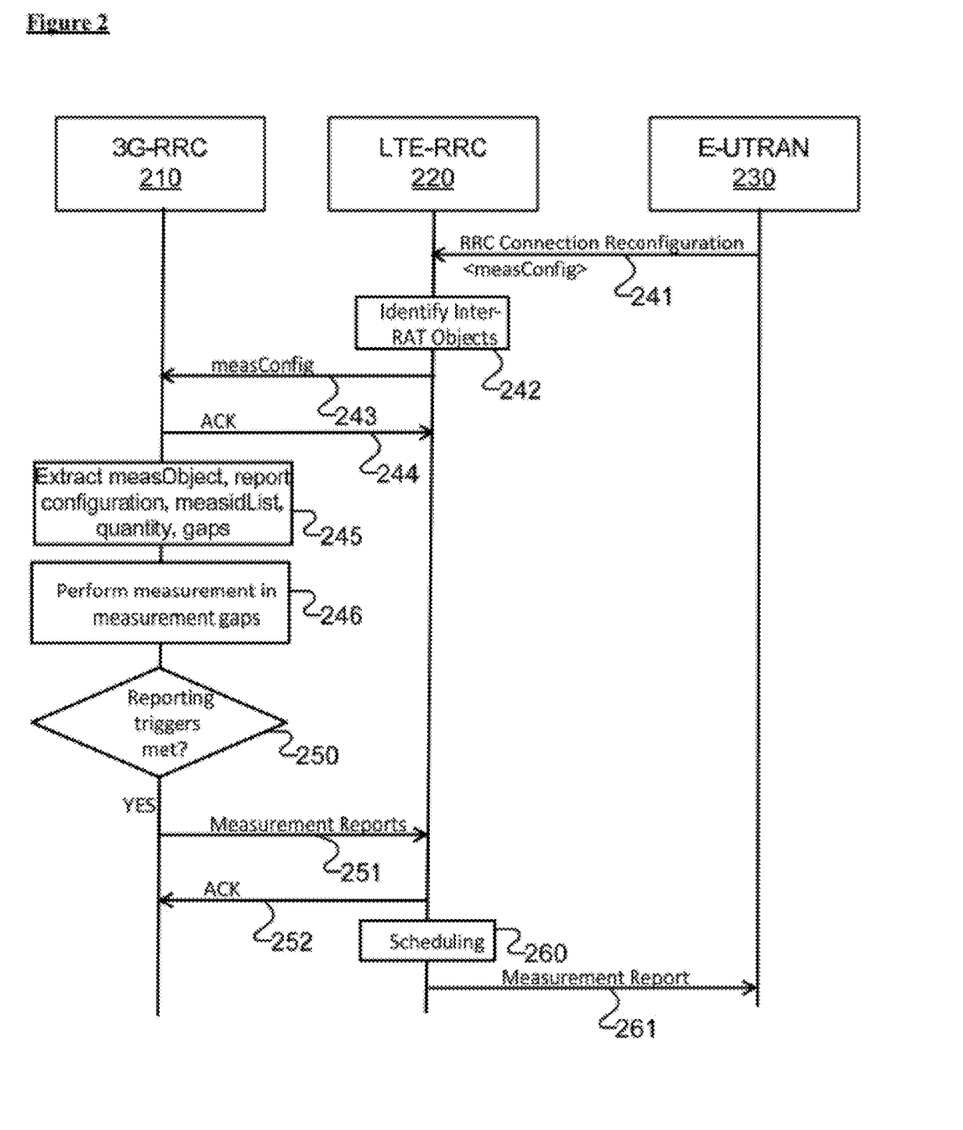
FIG. 2 is a signal diagram of one embodiment of a process for inter-RAT measurement.

FIG. 2 is a signal diagram of one embodiment of a process for inter-RAT measurement. The process is performed by processing logic that may comprise hardware (circuitry, dedicated logic, etc.), software (such as one that is run on a general purpose computer system or a dedicated machine), or a combination of both. In one embodiment, the process is performed in conjunction with a communication apparatus (e.g., apparatus with architecture with respect to FIG. 1). In one embodiment, the process is performed by one or more computer systems with respect to FIG. 5.

In one embodiment, referring to FIG. 2, a UE is connected to EUTRAN (LTE) when the inter-RAT measurement occurs. EUTRAN 230 sends a RRC connection reconfiguration message to LTE-RRC 220 (process block 241).

In one embodiment, upon receiving a measurement configuration (e.g., measConfig) in a RRC connection reconfiguration message, LTE RRC layer (e.g., 4G-RRC 220) determines whether there is a request for inter-RAT measurements (process block 242). If there is request for inter-RAT measurements, LTE-RRC 220 transfers the measurement configuration to the target RAT RRC layer (e.g., 3G-RRC 210) (process block 243).

In one embodiment, if the target RAT is not able to interpret/decode the measurement configuration, a proxy function (e.g., proxy agent 137 with respect to FIG. 1) translates the measurement configuration or sends decoded parameters in the measurement configuration.

In one embodiment, a target RAT (e.g., 3G-RRC 210) receives the measurement configuration. In one embodiment, 3G-RRC 210 acknowledges the receipt of the measurement configuration (process block 244).

In one embodiment, 3G-RRC 210 decodes measurement control parameters. 3G-RRC 210 extracts measurement objects, a report configuration, a measurement id list, measurement quantity, and measurement gaps (process block 245). If required, 3G-RRC 210 performs measurement in the predetermined measurement gaps as specified in the measurement configuration (process block 246).

In one embodiment, 3G-RRC 210 determines whether reporting criteria (reporting triggers) are met (process block 250). If the reporting triggers are met, 3G-RRC 210 sends the measurement report to the serving RAT (LTE-RRC 220) (process block 251). In one embodiment, LTE-RRC 220 acknowledges the measurement report (process block 252).

In one embodiment, LTE-RRC 220 performs scheduling (process block 260). In one embodiment, LTE-RRC 220 sends the measurement report to the target RAT network (EUTRAN 230) (process 261).

It will be appreciated by those skilled in the art that different RATs may be used as a serving RAT and a target RAT while maintaining approximately the same characteristic as described herein with respect to FIG. 2. The role of a serving RAT and a target RAT may be reversed in another handover procedure.

Figure 3:
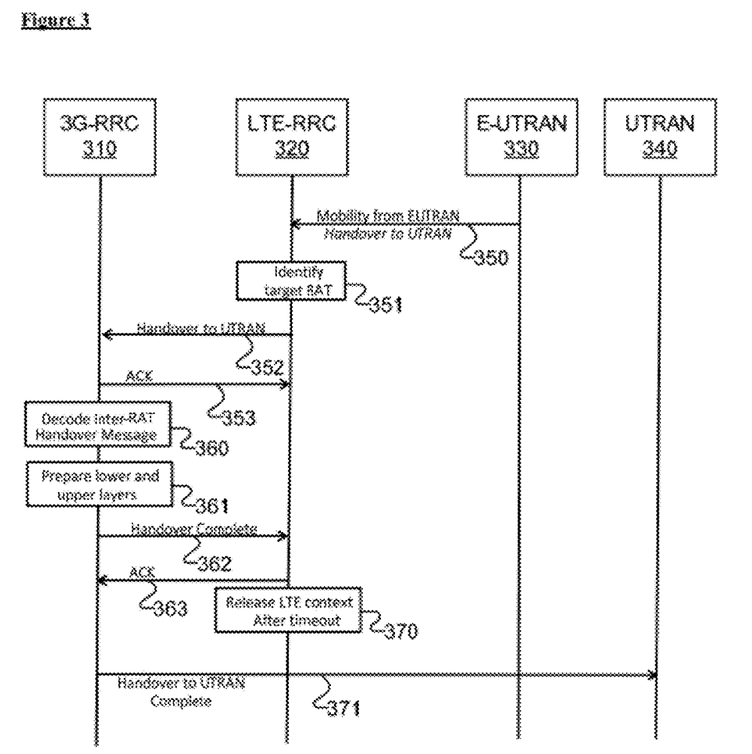
FIG. 3 is a signal diagram of one embodiment of a process for inter-RAT handover execution.

FIG. 3 is a signal diagram of one embodiment of a process for inter-RAT handover execution. The process is performed by processing logic that may comprise hardware (circuitry, dedicated logic, etc.), software (such as one that is run on a general purpose computer system or a dedicated machine), or a combination of both. In one embodiment, the process is performed in conjunction with a communication apparatus (e.g., apparatus with architecture with respect to FIG. 1). In one embodiment, the process is performed by one or more computer systems with respect to FIG. 5.

In one embodiment, referring to FIG. 3, a UE is connected to EUTRAN (LTE) at the initial stage. EUTRAN 330 instructs the UE to perform a handover to UTRAN 340. EUTRAN 330 send "mobility from EUTRAN" embedded with a command "Handover to UTRAN" (process block 350).

In one embodiment, LTE-RRC 320 identifies the target RAT specified in the embedded message (process block 351).

In embodiment, LTE-RRC 320 transfers the embedded handover message to 3G-RRC 310 (process block 352). In one embodiment, the transfer is performed in conjunction with proxy 127, proxy 137, and UART 180 with respect to FIG. 1. In one embodiment, 3G-RRC 310 acknowledges the handover message (process block 353).

In one embodiment, 3G-RRC 360 decodes radio parameters from the inter-RAT handover message (process block 360). 3G-RRC 360 prepares and configures lower and upper layers to be prepared for the handover execution (process block 361).

In one embodiment, after the configurations of lower and upper layers are completed, 3G-RRC 310 sends a "handover to UTRAN Complete" message, directly to UTRAN 340 (process block 371).

In one embodiment, 3G-RRC 310 also sends a handover complete message to LTE-RRC 320 (process block 362). LTE-RRC 320 acknowledges the message (process block 363). In one embodiment, LTE-RRC 320 removes LTE context from its RRC state machines after a timeout timer expires (process block 370).

It will be appreciated by those skilled in the art that different RATs may be used as a serving RAT and a target RAT while maintaining approximately the same characteristic as described herein with respect to FIG. 3. The role of a serving RAT and a target RAT may be reversed in another handover procedure.

Figure 4:
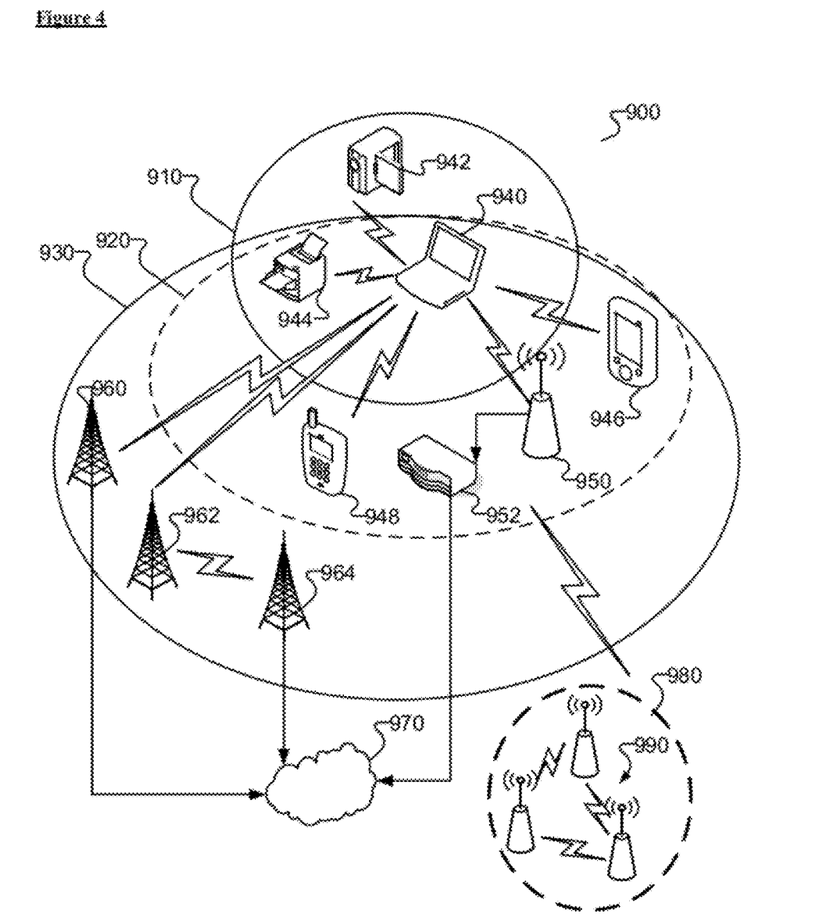
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s). For example, laptop computer 940 operates in accordance with LTE, advanced LTE, 3GPP2, 4G or related versions thereof.

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, In one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
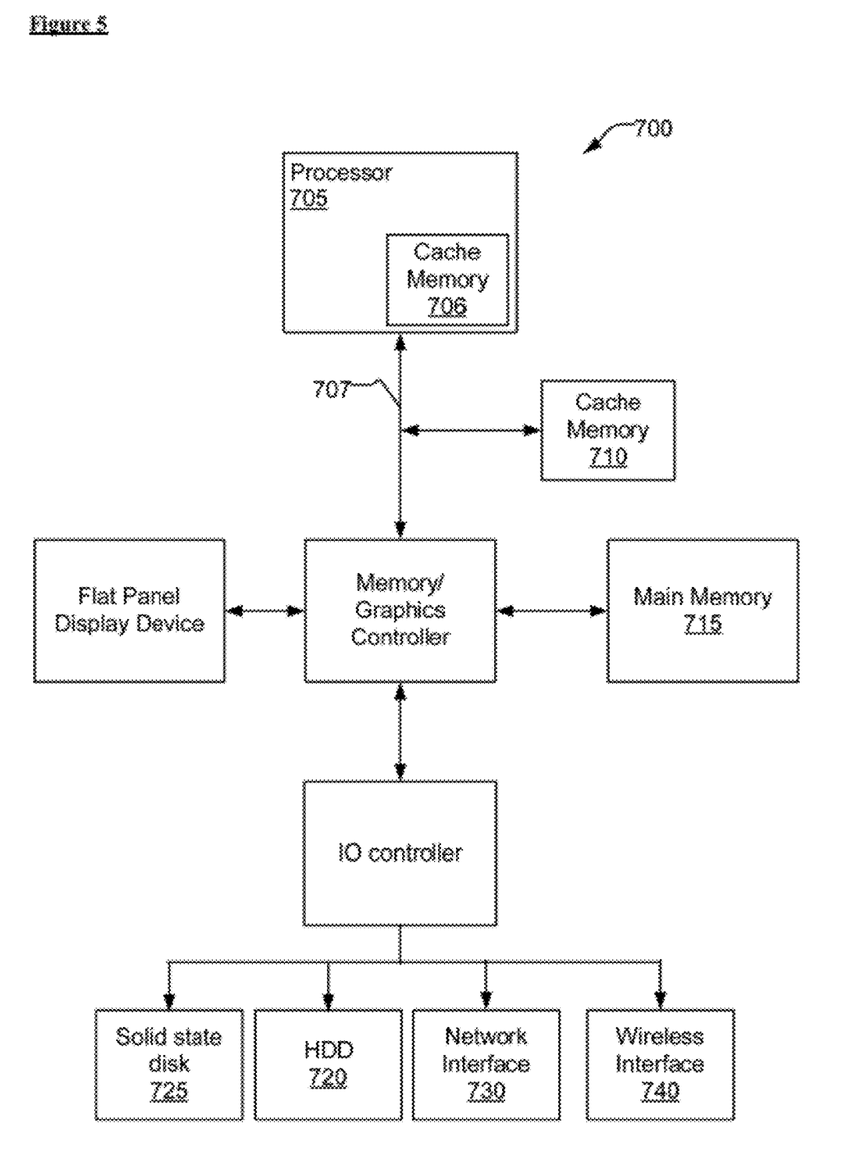
FIG. 5 illustrates a computer system for use with one embodiment of the present invention.

FIG. 5 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising: a bridging interface; and first radio resource control logic comprising a first proxy, wherein the first proxy is operable to commutatively couple to a second proxy via the bridging interface, wherein the first proxy is operable to support handover between different radio access technologies; wherein the first proxy is part of a radio resource control (RRC) layer and the second proxy is part of an RRC layer associated with a radio access technology (RAT) different than that of the first RRC layer and wherein the first proxy and the second proxy provide logical peering for inter-RAT operations by identifying messages, transferring messages, transferring context, and triggering inter-RAT procedures including performing measurement in measurement gaps; and wherein the first proxy is operable to transfer a handover message to the second proxy if the handover message is to cause a handover to a RAT supported by the second proxy, wherein the second proxy decodes parameters in the handover message and configures network layers based at least in part on the parameters.

2. The apparatus of claim 1, wherein the first radio resource control logic and the second radio resource control logic are non-integrated entities which communicatively coupled via the bridging interface.

3. The apparatus of claim 1, wherein the first proxy transfers a measurement configuration message to the second proxy if the measurement configuration message is for inter-RAT measurement.

4. The apparatus of claim 1, wherein the second proxy is operable to, in response to a measurement configuration message transferred from the first proxy, extract parameters in the measurement configuration message and perform measurement.

5. The apparatus of claim 1, wherein the second proxy is operable to send a measurement report to the first proxy and the first proxy is operable to propagate the measurement report to a RAT associated with the first proxy.

6. The apparatus of claim 1, wherein the second proxy is operable to inform the RAT directly when the handover is complete, wherein the second proxy is operable to inform the first proxy that the handover is complete so that the first proxy releases a current network context after expiry.

7. The apparatus of claim 1, wherein the first proxy is operable to identify messages, transfer messages, transfer security context, and trigger inter-RAT procedures.

8. A method for a radio access technology (RAT) comprising: determining whether a measurement configuration message is related to inter-RAT; determining which is the target RAT; and transferring the measurement configuration message to a target radio resource control logic associated with the target RAT; wherein said transferring is performed via logical peering between a first radio resource control (RRC) layer and a second RRC layer associated with the target RAT by identifying messages, transferring messages, transferring context, and triggering inter-RAT procedures including performing measurement in measurement gaps; and wherein said first RRC layer is operable to transfer a handover message if the handover message is to cause a handover to the target RAT, wherein the second RRC layer decodes parameters in the handover message and configures network layers based at least in part on the parameters.

9. The method of claim 8, wherein the transferring is performed by a first proxy agent of a serving radio resource control logic to a second proxy agent of the target radio control resource logic, wherein the serving radio resource control logic and the second radio resource control logic are logically or physically non-integrated entities which are communicatively linked.

10. The method of claim 8, further comprising: receiving a transfer of a measurement configuration message from a serving radio resource control logic; sending an acknowledgement message to the serving radio resource control logic; and performing measurement based at least in part on the measurement configuration message.

11. The method of claim 8, further comprising: sending, by the target radio resource control logic, a measurement report to be transferred to a serving RAT; and propagating the measurement report received from the target radio resource control logic to an enhance Node B (eNB) of the serving RAT.

12. The method of claim 8, further comprising: identifying a handover message to determine whether the handover message is an inter-RAT handover; and propagating the handover message to the target radio resource control logic.

13. The method of claim 8, further comprising: receiving a handover message transferred from different radio resource control logic providing network access in conjunction with first RAT; configuring a network connection based at least in part on connection information in the handover message; and sending a handover complete signal to a different second RAT.

14. The method of claim 8, further comprising: receiving a handover complete signal from the target radio resource control logic; acknowledging the handover complete signal; and releasing a network context associated with a serving RAT after expiry.

15. The method of claim 8, further comprising translating a message into a format readable by the target radio resource control logic.

16. A system for a radio access technology (RAT) comprising: memory to store data for establishing a network connection; and a radio device, coupled to the memory, comprising a first radio resource control logic for a first RAT to couple to a second radio resource control logic for a second RAT; wherein the first radio resource control logic is part of a radio resource control (RRC) layer of the first RAT and the second radio resource control logic is part of an RRC layer of the second RAT and wherein the first radio resource control logic and the second radio resource control logic provide logical peering for inter-RAT operations by identifying messages, transferring messages, transferring context, and triggering inter-RAT procedures including performing measurement in measurement gaps; and wherein the first radio resource control logic is operable to transfer a handover message to the second radio resource control logic if the handover message is to cause a handover to a RAT supported by the second radio resource control logic, wherein the second radio resource control logic decodes parameters in the handover message and configures network layers based at least in part on the parameters.

17. The system of claim 16, wherein the first radio resource control logic comprises a proxy agent to translate a message into a format readable by the second radio resource control logic.

18. The system of claim 16, wherein the first radio resource control logic is commutatively coupled to the second radio resource control logic via a low bandwidth interface.

* * * * *